US006772786B2

(12) United States Patent
Ellett

(10) Patent No.: US 6,772,786 B2
(45) Date of Patent: Aug. 10, 2004

(54) SELF-CONTAINED HYDRAULIC ESD SYSTEM

(75) Inventor: James Richard Ellett, Edmonton (CA)

(73) Assignee: Argus Machine Co. Ltd., Edmonton (CA)

( * ) Notice: Subject to any disclaimer, the term of this patent is extended or adjusted under 35 U.S.C. 154(b) by 226 days.

(21) Appl. No.: 10/079,832

(22) Filed: Feb. 22, 2002

(65) Prior Publication Data

US 2003/0155014 A1 Aug. 21, 2003

(51) Int. Cl.[7] .................................................. F16K 31/12
(52) U.S. Cl. ........................ 137/489; 137/488; 251/126
(58) Field of Search ................................ 137/484, 489; 251/126; 60/477; 91/6, 461

(56) References Cited

U.S. PATENT DOCUMENTS

| | | | | |
|---|---|---|---|---|
| 3,323,550 A | | 6/1967 | Lee, II | 138/39 |
| 4,188,968 A | * | 2/1980 | Trobaugh et al. | 137/488 |
| 4,774,980 A | * | 10/1988 | Etheridge | 137/488 |
| 5,505,229 A | | 4/1996 | Lee, II | 138/40 |
| 6,276,135 B1 | | 8/2001 | Ellett | 60/477 |

OTHER PUBLICATIONS

A copy of Canadian Patent Application No. 2,266,806, filed Mar. 23, 1999, published Sept. 23, 2000, 19 pages.

Drawing showing applicant 's previous design for a Flow Restrictor (Filtered Orifice), dated Mar. 14, 2000, 1 page.

SIGMA® Pneumatic Values —Restriction Orifices, SIGMA Enterprises, Inc., 1997 Technical Product Bulletin, 1 page.

AMOT Controls —Control Systems Accessories, 1 page, plus same page showing address and copyright information of AMOT Controls Corp., copyright 1997.

Lee Restrictors, pp. 1–13, from the Lee Technical Hydraulic Handbook, The Lee Company Technical Center, copyright 1971 (page with copyright information attached).

Lohm Laws —Engineering, pp. 2–5, from the Lee Technical Hydraulic Handbook, The Lee Company Technical Center, copyright 1971 (page with copyright information attached).

* cited by examiner

*Primary Examiner*—Kevin Lee
(74) *Attorney, Agent, or Firm*—Anthony R. Lambert

(57) ABSTRACT

A hydraulic control circuit, comprising a control line connected to a device to be controlled by fluid pressure in the control line; a time-out valve on the control line, the time-out valve having a time-out period during which time-out period operation of the time-out valve is delayed after actuation of the time-out valve; a pump connected to the control line for pressurizing the control line with fluid; and an arming valve operated by pressure on an arming line connected to the control line and the arming valve being connected to the time-out valve to reduce the time-out period in response to pressure on the control line.

15 Claims, 2 Drawing Sheets

SELF-CONTAINED HYDRAULIC ESD SYSTEM

BACKGROUND OF THE INVENTION

This invention relates to hydraulic emergency shut-down systems (ESD) for actuating closure of valves.

U.S. Pat. No. 6,276,135 issued Aug. 21, 2001, and Canadian application no. 2,266,806 published Sep. 23, 2001, describe a hydraulic control circuit for a hydraulic actuator, including a high-low pilot valve having a sensing port for connection to a flow line. When the sensed pressure from the flow line moves outside of a pre-set operating range, the hydraulic actuator is actuated and flow in the line is stopped. For initiating the operation of the high-low pilot, a time out valve is closed on the hydraulic control circuit to allow manual build up of pressure in the hydraulic control circuit to the operating range. This opens the hydraulic actuator and the high-low pilot maintains pressure on the hydraulic circuit to keep the hydraulic actuator open.

A difficulty occurs with this hydraulic control circuit in that there may be a period in which the time-out valve is closed, but the hydraulic actuator is open, so that there is fluid flow in the flow line, with no way to monitor the pressure in the flow line.

SUMMARY OF THE INVENTION

This invention is directed to providing increased safety of operation of a self-contained hydraulic emergency shut down system.

Therefore, according to an aspect of the invention, there is provided a hydraulic control circuit, comprising a control line connected to a device to be controlled by fluid pressure in the control line; a time-out valve on the control line, the time-out valve having a time-out period during which time-out period operation of the time-out valve is delayed after actuation of the time-out valve; a pump connected to the control line for pressurizing the control line with fluid; and an arming valve operated by pressure on an arming line connected to the control line and the arming valve being connected to the time-out valve to reduce the time-out period in response to pressure on the control line.

The hydraulic control circuit has particular utility for use with a flow line and the device to be controlled is a valve on the flow line.

In a further aspect of the invention, the time-out valve includes a restrictor on a fluid return line that regulates the time-out period. The restrictor may comprise plural loops of continuous tubing arranged in plural layers, preferably spirally wound, the tubing having a smaller inner diameter than the fluid return line. In a further aspect of the invention, the arming valve operates a bypass around the restrictor. In a further aspect of the invention, the time-out valve is normally open, and is closed after actuation until expiry of the time-out period.

In addition, this invention provides a novel configuration of bias restrictor for use on a control line on a hydraulic circuit. The restrictor comprises plural loops of continuous tubing arranged in plural layers, preferably spirally wound, the tubing having a smaller inner diameter than the control line.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, a reference to "a connection", "connected" or "connect(s)" is a reference to hydraulic connection unless the context otherwise requires. In this patent document, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

Figure 1:
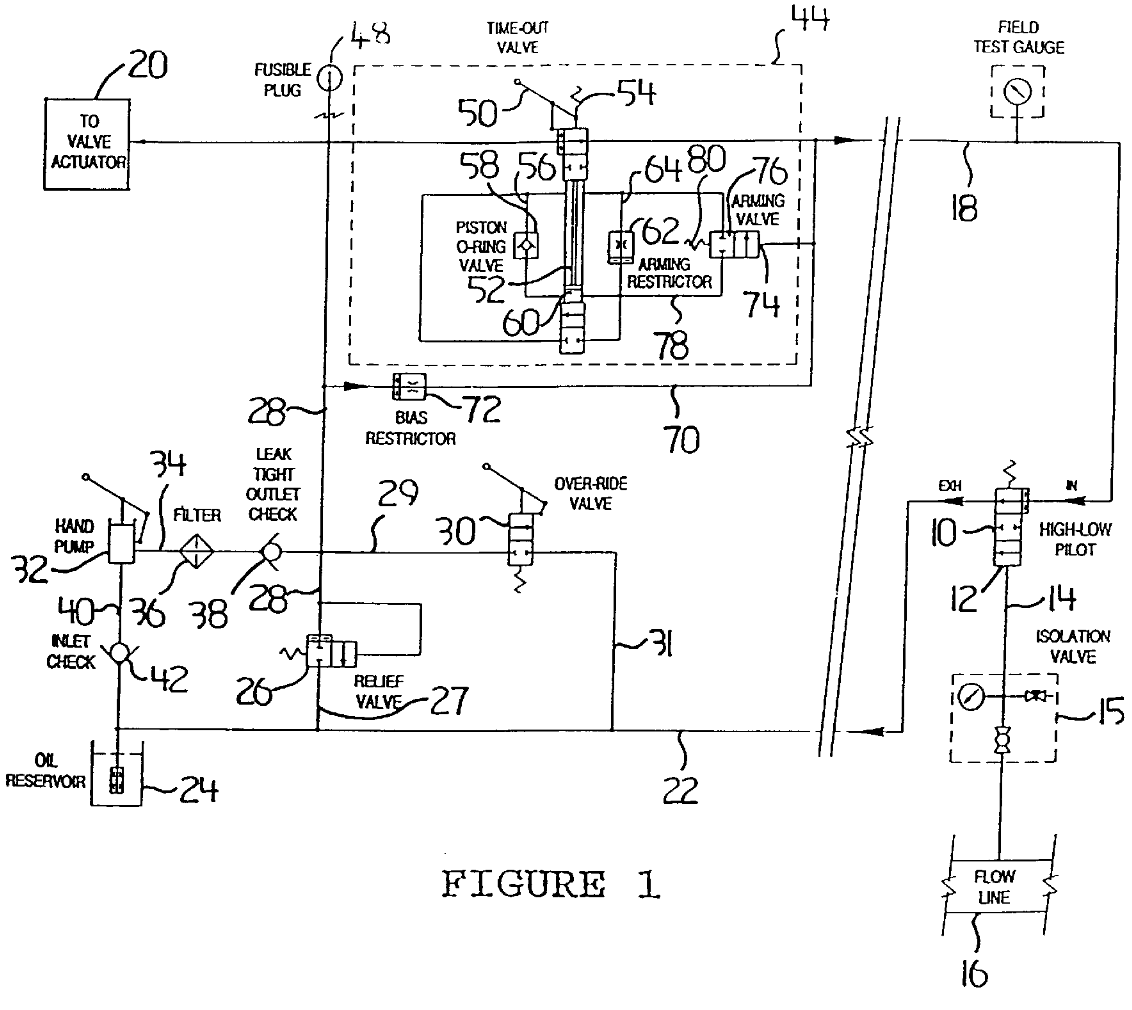
FIG. 1 is a hydraulic schematic of a hydraulic control circuit according to the invention.

Referring to FIG. 1, there is shown a hydraulic control circuit for an actuator 20, which actuates a valve, not shown. A high-low pilot valve 10 is connected to a flow line 16 to be monitored through port 12 of valve 10 and line 14 through isolation valve 15. A single pressure line or hydraulic manifold 18 connects the high-low pilot 10 to the hydraulic actuator 20. The single pressure line 18 has a single pressure along its length, and thus forms a single pressure circuit. A second line 22 connects the high-low pilot 10 to a reservoir 24. A normally closed relief valve 26 is connected to the single pressure line 18 through line 28 for relief of excessive pressure and drains through line 27 and line 22 to the reservoir 24. A normally closed override valve 30 is connected to the single pressure line through line 28 and 29 for manual override of circuit controls. The line 28 connects to the line 18 between a time out valve 44 and actuator 20. The override valve 30 drains through line 31 and 22 to the reservoir 24. A pump 32 is connected to the single pressure line 18 via line 34 and line 28 for pressuring the single pressure line. The pump 32 is preferably a hand pump, and is separated from the line 28 by a filter 36 and a leak tight outlet check valve 38, both on line 34. The pump 32 is also connected via line 40 with inlet check valve 42 to reservoir 24. A fusible plug 48 for relief of pressure eg during fires is also provided on line 18.

When the pump 32 is activated, fluid moves from reservoir 24 through lines 40, 34 and 28 into line 18. The relief valve 26 and override valve 30 block return of fluid to reservoir 24, and thus pressure builds up in line 18 when the pump 32 is activated. The time out valve 44 is normally open, and is set to close a pre-set time interval after being manually activated.

The hydraulic control circuit works as follows. The high-low pilot 10 monitors pressure in the flow line 16 and is normally closed. When the pressure exceeds a high set point or is lower than a low set point, the pilot valve 10 opens, and hydraulic fluid drains from line 18 and 22 into reservoir 24. Loss of pressure at the actuator 20 causes the actuator 20 to close its associated valve. If the pressure in lines 28 or 18 becomes too high itself, then relief valve 26 opens, until the pressure returns to normal. The actuator 20 can be activated manually by operation of the override valve 30. If the temperature becomes too high, fusible plug 48 opens to allow line 18 to drain and activate the actuator 20. Fusible plug 48 may be connected by a line (not shown) to discharge to the tank 24.

To set the actuator 20 initially, pressure must be built in line 18. This is accomplished initially by manually closing time out valve 44. High low pilot 10 is open with low line pressure being sensed. The time out valve 44 begins to count down towards opening. While time out valve 44 is closed, pump 32 is activated to increase the pressure in lines 18 and 28 until actuator 20 is activated. Activation of actuator 20 will lead to increase of pressure in flow line 16, and if the line is working properly, pressure in line 16 will be in its intended operating range. Thus, when valve 44 opens, the high-low pilot 10 will have closed, thus maintaining pressure in line 18 and activating the actuator 20 with pressure in line 18. The amount that the handle 50 is moved downward establishes the length of the time-out period, for example 90 seconds maximum at 20° C.

The time out valve 44 has a manually operated handle 50 which when pushed downward lifts a piston 52 and loads a spring 54. When the piston 52 is moved upward, fluid above the piston 52 flows through line 56 and piston O-ring valve 58 to the chamber 60 on the other side of the piston 52. When the handle 50 is released, pressure of the spring 54 forces the piston 52 downward and fluid out of the chamber 60. Flow through valve 58 is blocked, and so the fluid passes through flow restrictor 62 on line 64 back to the other side of the piston 52. Line 64 may be a fitting on the valve 44. The flow restrictor 62 therefore provides a regulated time out period that determines how long the time-out valve 44 remains closed while pressure is built up in line 18.

If the flow line pressure does not come within the high and low set points of the high-low pilot 10 before the end of the time-out period, the high-low pilot 10 will shut down the ESD system when the time-out period expires. If the flow line pressure does come within the high and low set points of the high-low pilot 10 before the end of the time-out period, a circuit is supplied to automatically end the time-out period and thus effectively reduce the time-out period. This circuit includes a control line 70 that senses pressure on the side of line 18 that is between the time-out valve 44 and the valve actuator 20. The line 70 has a flow restrictor 72 and delivers pressure to a port 74 of an arming valve 76. Arming valve 76 is provided on a line 78 that bypasses the restrictor 62, so that when the arming valve 76 is armed, fluid in reservoir 60 bleeds rapidly through line 78 to the other side of the piston 52, thus ending the time-out period. Pressure build-up sensed at port 74 of the arming valve 76 is regulated by bias restrictor 72. The bias restrictor 72 allows pressure to build up in line 18 upon operation of the hand pump 32, and allows the pressure at port 74 to operate arming valve 76 when the pressure in line 18 reaches the a low set point determined by the selection of a spring 80 on the arming valve 76.

Figure 2A:
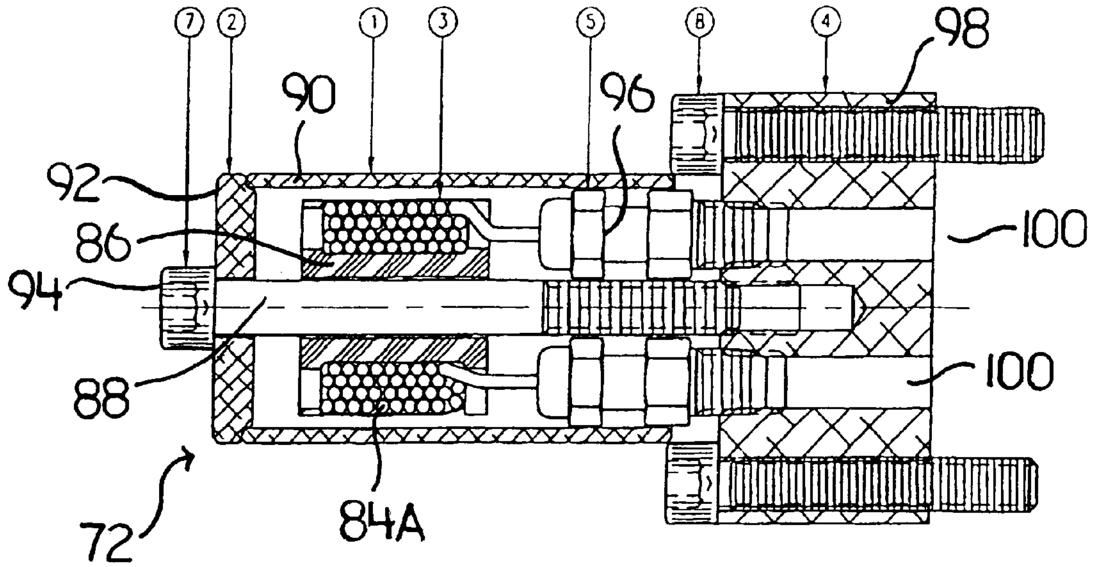
FIGS. 2A and 2B are sections through restrictors for use in hydraulic control circuits and particularly in the hydraulic control circuit of FIG. 1.
Figure 2B:
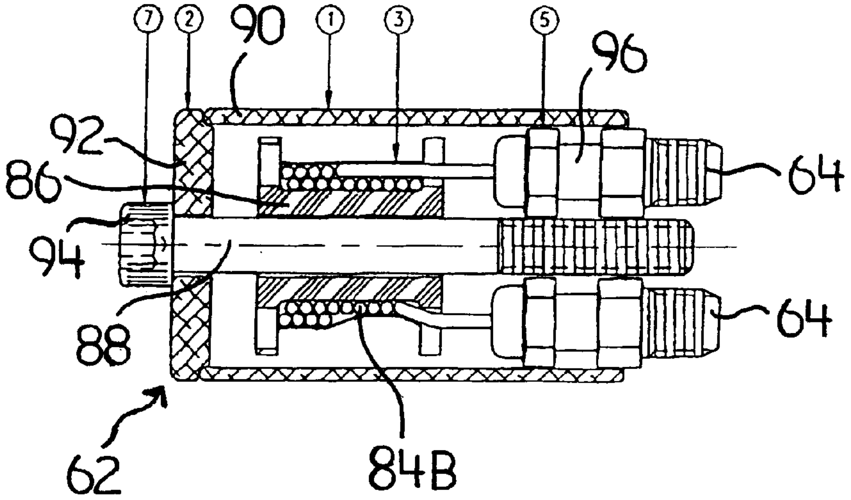

Although any flow restrictor may be used as the flow restrictor 62 or 72 in the hydraulic control circuit disclosed here, according to a further inventive aspect disclosed here, the flow restrictor 62, 72 may be formed of plural loops of continuous tubing 84A, 84B arranged in plural layers as shown in FIGS. 2A and 2B. The tubing 84A, 84B has a smaller inner diameter than the inner diameter of the control line 70, 64. Preferably, the tubing 84A, 84B is spirally wound around a spool 86. The relative sizes of the inner diameters of the tubing 84A, 84B and control line 70, 64 are selected for a desired pressure differential across the restrictor 72, 62 respectively. The control line, as for example control line 64 in this case, may be a fitting on another part, for example a valve, in which the case the inner diameter of the control line is simply the inner diameter of the fitting. A restrictor of the type shown here is preferred over conventional orifice discs with a very small hole, since the small hole is subject to blockage, and the small filter mesh used to prevent blockage is subject to blockage. The elongated inner diameter of the plural loops of continuous tubing is four to six times larger than an orifice disc diameter to give the same amount of restriction to hydraulic oil flow. This larger inner diameter accommodates the bulk of the contaminants in the system, substantially reducing the requirement for cleaning, and maintaining free flow through the filters and restrictors.

The sections in FIGS. 2A and 2B are characteristic of all sections through the axis of the spool, except that the connections appear as shown in only one section. For both restrictors 72, 62, the tubing spools 86 are secured on a shaft 88 and protected by a cylindrical housing 90 and top cap 92 held on bolt 94. At the opposite end to top cap 92, the housing 90 is capped by a tubing connector spool 96, as for example a swagelock fitting. In the case of the bias restrictor 72 of FIG. 2A, the fittings thread into a base plate 98 that has openings 100 for receiving the control line 70. In the case of the arming restrictor 62 of FIG. 2B, the fittings thread directly into the valve 44 and themselves form the control line 64. In an exemplary embodiment, the tubing 84A, 84B had an inner diameter of 0.020 inches, and the control lines had a diameter of 0.18 inches. The tubing 84A in an exemplary embodiment is 88 inches long, while the tubing 84B is 15 inches long.

The pilot 10 is designed to bleed down an E.S.D. hydraulic circuit when high or low pressures are sensed, such as in an Oil/Gas production or pipeline facility. The high and low set points are independently adjustable to meet predetermined levels, in accordance with the desire of the operations personnel. The pilot may be used for high only or low only or both high and low in one unit. Several springs can be chosen to provide a broad range of set points, in both high and low categories. Standard high and low set points may range between 50 and 2000 PSI. Various conventional fluids may be used as the hydraulic fluid, depending on the temperature requirements, such as automatic transmission fluid and aircraft hydraulic oil. Various conventional filter discs (not shown here) are used within the hydraulic circuit disclosed here, in proximity to the time-out valve 44, over-ride valve 30, relief valve 26, hydraulic pump 32, arming valve 76, restrictor 72 and high-low pilot 10 in conventional manner for protection of hydraulic circuits and valves.

A person skilled in the art could make immaterial modifications to the invention described in this patent document without departing from the essence of the invention.

What is claimed is:

1. A hydraulic control circuit, comprising:

a control line connected to a device to be controlled by fluid pressure in the control line;

a time-out valve on the control line, the time-out valve having a time-out period during which time-out period operation of the time-out valve is delayed after actuation of the time-out valve;

a pump connected to the control line for pressurizing the control line with fluid; and an arming valve operated by pressure on an arming line connected to the control line and the arming valve being connected to the time-out valve to reduce the time-out period in response to pressure on the control line.

2. The hydraulic control circuit of claim 1 in which pressure in the control line is responsive to operating pressure in a flow line and the device to be controlled is a valve actuator that controls a valve on the flow line.

3. The hydraulic control circuit of claim 1 in which the time-out valve includes a restrictor on a fluid return line that regulates the time-out period.

4. The hydraulic control circuit of claim 3 in which the restrictor comprises:

plural loops of continuous tubing arranged in plural layers, the tubing having a smaller inner diameter than the fluid return line.

5. The hydraulic control circuit of claim 4 in which the layers are spirally wound.

6. The hydraulic control circuit of claim 3 in which the arming valve operates a bypass around the restrictor.

7. The hydraulic control circuit of claim 4 in which the arming valve operates a bypass around the restrictor.

8. The hydraulic control circuit of claim 5 in which the arming valve operates a bypass around the restrictor.

9. The hydraulic control circuit of claim 1 in which the time-out valve is normally open, and is closed after actuation until expiry of the time-out period.

10. The hydraulic control circuit of claim 1 further comprising a restrictor on the arming line to allow pressure build up in the control line.

11. The hydraulic control circuit of claim 10 in which the restrictor comprises:

plural loops of tubing arranged in plural layers, the tubing having a smaller inner diameter than the arming line.

12. The hydraulic control circuit of claim 11 in which the layers are spirally wound.

13. The hydraulic control circuit of claim 1 in which the device to be controlled is a valve actuator.

14. A hydraulic control circuit, comprising:

a control line connected to valve actuator;

a time-out valve on the control line, the time-out valve having a time-out period during which time-out period operation of the time-out valve is delayed after actuation of the time-out valve;

a pump connected to the control line for pressurizing the control line with fluid;

an arming valve operated by pressure on an arming line connected to the control line and the arming valve being connected to the time-out valve to reduce the time-out period in response to pressure on the control line; and a restrictor on the arming line to allow pressure build up in the control line, the restrictor comprising plural loops of continuous tubing arranged in plural layers, the tubing having a smaller inner diameter than the control line.

15. A hydraulic control circuit, comprising:

a control line connected to a valve actuator;

a high-low pilot connected to the control line and a flow line, the high-low pilot being operable to control flow in the control line as a result of sensing pressure in the flow line being in a pre-set range;

a time-out valve on the control line between the actuator and the high-low pilot, the time-out valve having a time-out period during which time-out period operation of the time-out valve is delayed after actuation of the time-out valve;

a pump connected to the control line for pressurizing the control line with fluid;

an arming valve operated by pressure on an arming line connected to the control line and the arming valve being connected to the time-out valve to reduce the time-out period in response to pressure on the control line; and a restrictor on the arming line to allow pressure build up in the control line, the restrictor comprising plural loops of continuous tubing arranged in plural layers, the tubing having a smaller inner diameter than the control line; whereby, when the high-low pilot shuts before the time out period expires, the arming valve disables the time-out valve and immediately puts the high-low pilot in control of the actuator.

* * * * *